United States Patent [19]

Posso

[11] Patent Number: 4,762,223

[45] Date of Patent: Aug. 9, 1988

[54] TYING AND STORAGE RING FOR A REEL OF RECORDING TAPE

[75] Inventor: Patrick P. P. Posso, Lausanne, Switzerland

[73] Assignee: Gefitiech S.A., Lausanne, Switzerland

[21] Appl. No.: 70,905

[22] Filed: Jul. 8, 1987

[30] Foreign Application Priority Data

Sep. 9, 1986 [CH] Switzerland ............... 3614/86

[51] Int. Cl.$^4$ .................................. B65D 85/67
[52] U.S. Cl. ........................ 206/53; 206/398; 206/400; 24/20 R; 292/256.6; 292/DIG. 38
[58] Field of Search ............... 206/53, 54, 55, 389, 206/398, 400; 24/16 R, 20 R, 21; 292/246, 248, 249, 250, 256.6, 256.65, DIG. 38; 242/55.53

[56] References Cited

U.S. PATENT DOCUMENTS

| 2,776,159 | 1/1957 | Cookson | 292/256.6 |
| 3,730,576 | 5/1973 | Schurman | 292/246 |
| 3,921,798 | 11/1975 | Dean et al. | 206/53 |
| 3,939,977 | 2/1976 | Price et al. | 206/53 |
| 4,023,839 | 5/1977 | Bisbing | 292/DIG. 38 |
| 4,244,612 | 1/1981 | Schurman | 292/249 |
| 4,275,484 | 6/1981 | Irio et al. | 24/20 R |
| 4,388,991 | 6/1983 | Price | 206/53 |
| 4,625,866 | 12/1986 | Posso | 206/53 |
| 4,635,789 | 1/1987 | Webb | 206/53 |
| 4,665,596 | 5/1987 | Green | 292/DIG. 38 |

FOREIGN PATENT DOCUMENTS 705759 3/1954 United Kingdom ........... 292/256.65

Primary Examiner—David T. Fidei
Attorney, Agent, or Firm—Kane, Dalsimer, Sullivan, Kurucz, Levy, Eisele and Richard

[57] ABSTRACT

A tying and storage ring for a reel of recording tape has a strip of extensible flexible material intended for surrounding a reel. It is equipped with closing means having a buckle made in one piece with a suspension hook and fastened rigidly to one of the ends of the strip, this buckle, when under tension, catching on a boss formed on the other end of the strip. The buckle has an orifice surrounding the boss and its sides have gripping means. The strip can also have a protective boss located very near the end of the buckle or, in an alternative embodiment, the end of the buckle has a sloping front face preventing the buckle from being caught accidentally.

3 Claims, 2 Drawing Sheets

TYING AND STORAGE RING FOR A REEL OF RECORDING TAPE

FIELD OF THE INVENTION

The present invention relates to a tying and storage ring for a reel of recording tape, intended to be used with a reel comprising a hub and a pair of circular parallel webs, this ring comprising a strip of extensible flexible material equipped, on one of its faces, with longitudinal ribs, intended for engaging on either side of the webs of the reel, and equipped with a suspension hook and with closing and tensioning means comprising a buckle integral with one of the ends of the strip, and with a boss which is integral with the other end of the strip and on which the said buckle catches under tension.

PRIOR ART

Several rings of this type, all comprising a buckle articulated on the strip, are known. Of the rings found on the market, an example which may be mentioned is the ring described in the U.S. Pat. No. 3,696,935, comprising a buckle articulated on a boss of the strip by means of a link made in one piece with the buckle, this buckle catching on a boss made in one piece with the suspension hook fastened to the other end of the strip. The buckle opens on the same side as the link, and a protective boss is located opposite this end of the buckle for the purpose of preventing inopportune opening of the buckle as a result of accidental catching during the handling of the reel. However, some distance must be left between the end of the buckle and the protective boss, to make it possible to insert a finger in order to lift the end of the buckle to open the latter. In another embodiment described in the U.S. Pat. No. 4,388,991, the buckle is equipped with a bar, by means of which it is held and articulated on the strip via a piece incorporating the suspension hook. Once again, a protective boss is provided opposite the end of the buckle. In all these known embodiments, the buckle is articulated, and the protective boss is located at a sufficient distance from the buckle to allow it to be lifted by means of a finger. Although, in most cases, the protective boss prevents the end of the buckle from catching on an obstacle, the ring from opening accidentally and consequently the reel from falling, nevertheless the risks of accidental catching of the end of the buckle are still high because of the space necessary between the end of the buckle and the protective boss.

The object of the invention is to reduce the risk of accidental opening of the ring as a result of the catching of the end of the buckle, whilst at the same time simplifying the construction of this buckle.

SUMMARY OF THE INVENTION

To achieve this, the tying and storage ring according to the invention is defined in that the buckle is made in one piece with the suspension hook, in that it is fastened rigidly to the strip, in that it has an orifice surrounding the boss on which it is caught, and in that its sides have gripping means.

The buckle surrounds the boss, on which it is caught, without covering it. It is thus possible to open the buckle by grasping it at its sides between the thumb and second finger and retaining the catching boss with the forefinger.

Because the buckle no longer has to be lifted at its end, this end can terminate in a sloping front face, the lower edge of which comes in contact with the strip, so that the protective boss becomes superfluous.

If the protective boss is preserved, it can be arranged very near the end of the buckle and even in such a way that the end of the buckle almost comes in contact with the protective boss. Catching of the end of the buckle is therefore virtually impossible.

On the other hand, tying rings in which the buckle is made in one piece with the strip are known (U.S. Pat. Nos. 3,095,969, 3,227,269 and 3,939,977). Such a solution would seem to make production simpler, but the various requirements regarding elasticity and flexibility where the strip and buckle are concerned are difficult to reconcile, even if a stiffening rib is provided (U.S. Pat. No. 3,227,269). Moreover, in these embodiments, the buckle once again opens at the end, and the presence of a protective boss, such as that provided in one of these embodiments (U.S. Pat. No. 3,939,977), presents the same problems as in the rings with an attached buckle.

The use of a single attached element which simultaneously forms the closing buckle and the suspension hook makes it possible to provide a flexible and elastic strip and a hook and a rigid buckle allowing effective closing of the ring under tension and firm suspension. The attached element is preferably fastened in a way described in French Patent No. 2,565,393, that is to say at two points, one of the bayonnet type and the other with a split dog.

BRIEF DESCRIPTION OF THE DRAWINGS

The accompanying drawings illustrate two embodiments of the invention by way of example.

DESCRIPTION OF THE PREFERRED EMBODIMENTS

Figure 1:
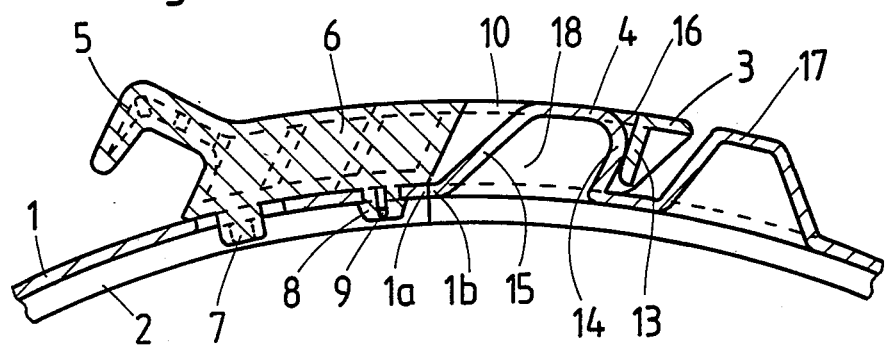
FIG. 1 is a partial view of the tying and storage ring in section along the line I—I of FIG. 2, according to a first embodiment.
Figure 2:
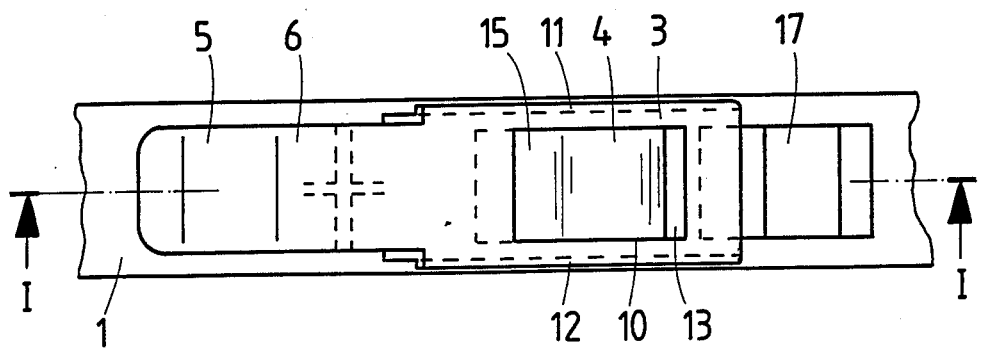
FIG. 2 is a plan view from above of the same part of the ring.

The tying and storage ring illustrated in FIGS. 1 and 2 comprises a strip 1 of slightly elastic flexible material, for example polyethylene, equipped, on its inner face, with two pairs of parallel ribs 2, between which the webs of the reel engage in a known way. In the closed position shown in the drawing, the two ends 1a and 1b of the strip 1 are joined together under the effect of the tension of a closing buckle 3 which catches on a catching boss 4 formed in the strip 1.

The buckle 3 is made in one piece with a suspension hook 5 composed of relatively rigid material, for example acrylonitrile/butadiene/styrene, so as to ensure tension on the strip 1. The body 6 carrying the buckle 3 and the hook 5 is fastened to the band 1 by means of a system comprising a bayonnet 7 and a split dog 8, as described in French Patent No. 2,565,393. As described in this prior patent, the split dog 8 is locked by means of a stud 9 inserted into the slot of the split dog. The piece 6 is therefore fastened to the strip 1 in a completely rigid manner.

The buckle 3 has a rectangular cut-out 10 surrounding the catching boss 4 and two vertical and parallel lateral wings 18 located on each side of the boss 4. The buckle 3 is intended to be grasped laterally and for this purpose has gripping means which here comprise rims 11 and 12 projecting slightly from its upper face. The buckle also has, near its end, a transverse wall 13 directed slightly towards the rear of the buckle and bearing against the front wall 14 of the catching boss 4, this front wall 14 sloping in the direction of the end of the buckle 3. On the other side, the catching boss 4 has a wall in the form of an inclined plane 15, intended to make it easier for the buckle 3 to pass over the catching boss 4. The end 16 of the catching boss 4 located on the same side as the end of the buckle 3 is rounded to make it possible to tension and close the ring simply by pressing on the buckle.

The strip 1 also has a protective boss 17 which is formed by being molded in the strip and which is intended for protecting the ring against inopportune opening of the buckle 3 as a result of accidental catching of its end. Since this end is not normally used to open the buckle 3, the protective boss 17 can be located very near the end of the buckle 3. The distance between the buckle 3 and the protective boss 17 is preferably less than or equal to 2 mm, so that there are virtually no risks of accidental catching of the end of the buckle. The upper face of the protective boss is at least level with the upper face of the buckle 3.

To secure the tying ring around a reel, the strip 1 is first placed around the reel, without paying attention to the buckle 3. When the ends 1a and 1b of the strip 1 approach one another, the lower edge of the transverse wall 13 of the buckle 3 comes up against the inclined plane 15 of the catching boss 4 and slides on this boss, thus reaching the upper portion of the rounded part 16. It is then sufficient to exert pressure on the buckle 3 to ensure that the lower end of its wall 13 slides on the rounded part 16, thereby tensioning the strip 1, and subsequently comes up against the sloping face 14 of the catching boss set back relative to the lower end of the rounded part 16.

To open the tying ring, it is sufficient to grasp the buckle 3 laterally between the thumb and second finger and lift this buckle, whilst retaining the boss 4 with the forefinger.

Figure 3:
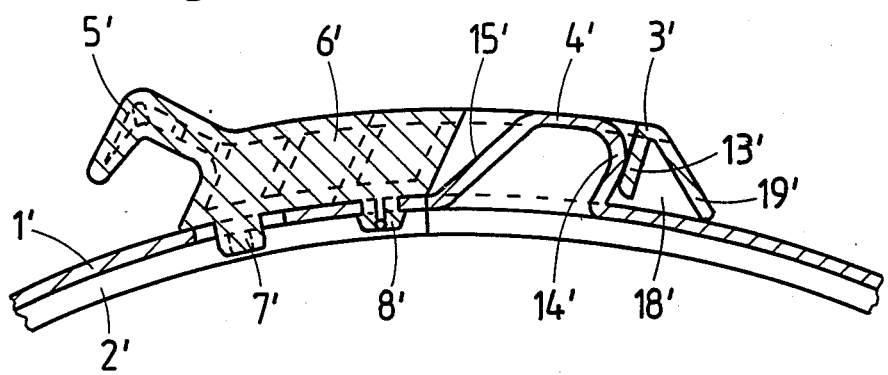
FIG. 3 is a view, similar to that of FIG. 1, of a second embodiment in a section along the line III—III of FIG. 4.
Figure 4:
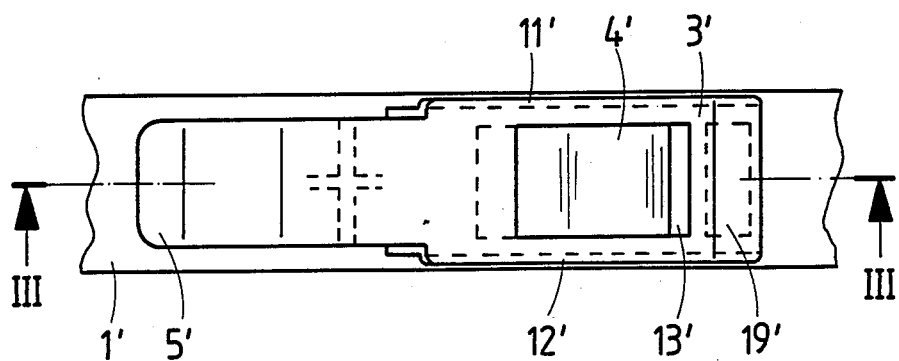
FIG. 4 is a plan view from above of the ring part illustrated in FIG. 3.

A second embodiment is illustrated in FIGS. 3 and 4. Since many features of this second embodiment are identical to those of the first embodiment, the identical parts have been designated by the same reference numerals bearing the sign ', and there is therefore no need to repeat the detailed description of these parts. This second embodiment will more easily be described in terms of the differences between it and the first embodiment. This second embodiment differs from the first embodiment the absence of the protective boss 17. The latter is no longer necessary because the end of the buckle 3' has a sloping front face 19 forming an obtuse angle with the surface of the strip 1'. The lower end of this sloping front face 19 comes in contact with the strip 1'. If the par of the strip 1' located in front of the buckle 3' or the front face 19 comes up against an obstacle, the obstacle will slide on this front face 19 without catching on the buckle 3'. Because the side walls 18' of the buckle 3' extend up to the end 19, the buckle is also prevented from being accidentally caught laterally.

I claim:

1. A tying and storage ring for a reel of recording tape, said reel comprising a hub and a pair of circular parallel webs, said ring comprising a strip of extensible flexible material (1) equipped, on a face thereof with two pairs of parallel longitudinal ribs (2), each rib positioned so as to engage one side of the webs of the reel, and said ring comprising a suspension hook (5) and with closing and tensioning means comprising a buckle (3) integral with one of the ends of the strip, and with a boss (4) which is integral with the other end of the strip and positioned such that the said buckle catches it when under tension, wherein the said buckle (3) is made in one piece with the suspension hook (5), wherein said buckle is fastened rigidly to the strip (1), wherein said buckle has an orifice (10) surrounding the boss (4) on which said buckle is caught, and wherein said buckle's side has gripping means (11, 12).

2. A tying ring as claimed in claim 1, further comprising a protective boss (17) which is located at said catching boss's rear (4) and is of a height substantially equal to the height of the closed buckle, wherein the distance between the end of the buckle (3) and the protective boss (17) is less than 2 mm whereby the risks of the buckle accidentally opening are reduced.

3. A tying ring as claimed in claim 1, wherein the end of the buckle (3') has a sloping front face (19') forming an obtuse angle with the strip.

* * * * *